H. A. HUNTOON.
PLOW ADJUSTING MECHANISM.
APPLICATION FILED MAY 1, 1913.
1,078,285.
Patented Nov. 11, 1913.
2 SHEETS—SHEET 1.
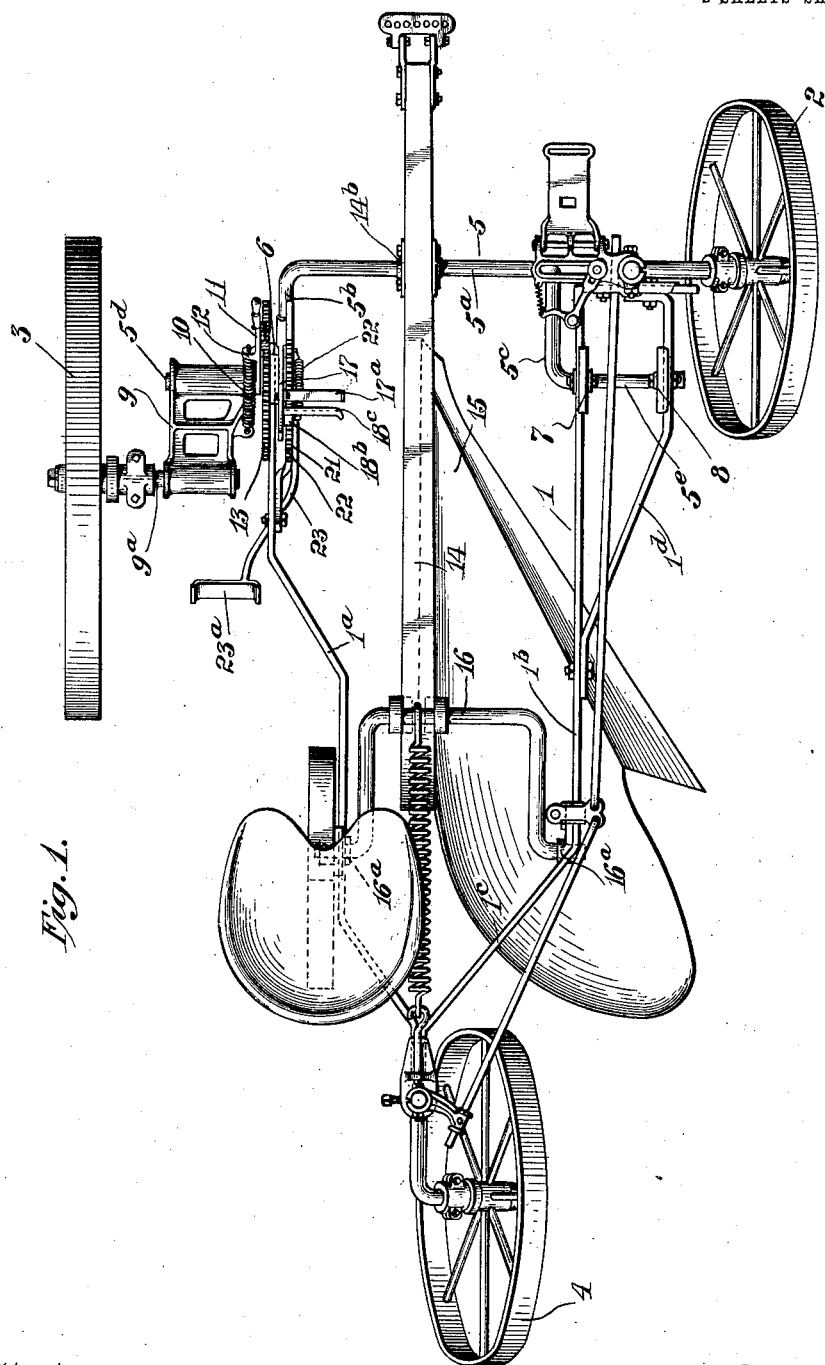
Attest:
J. S. Mitchell
M. R. Manning
Inventor:
H. A. Huntoon
by Philip T. Dodge Atty

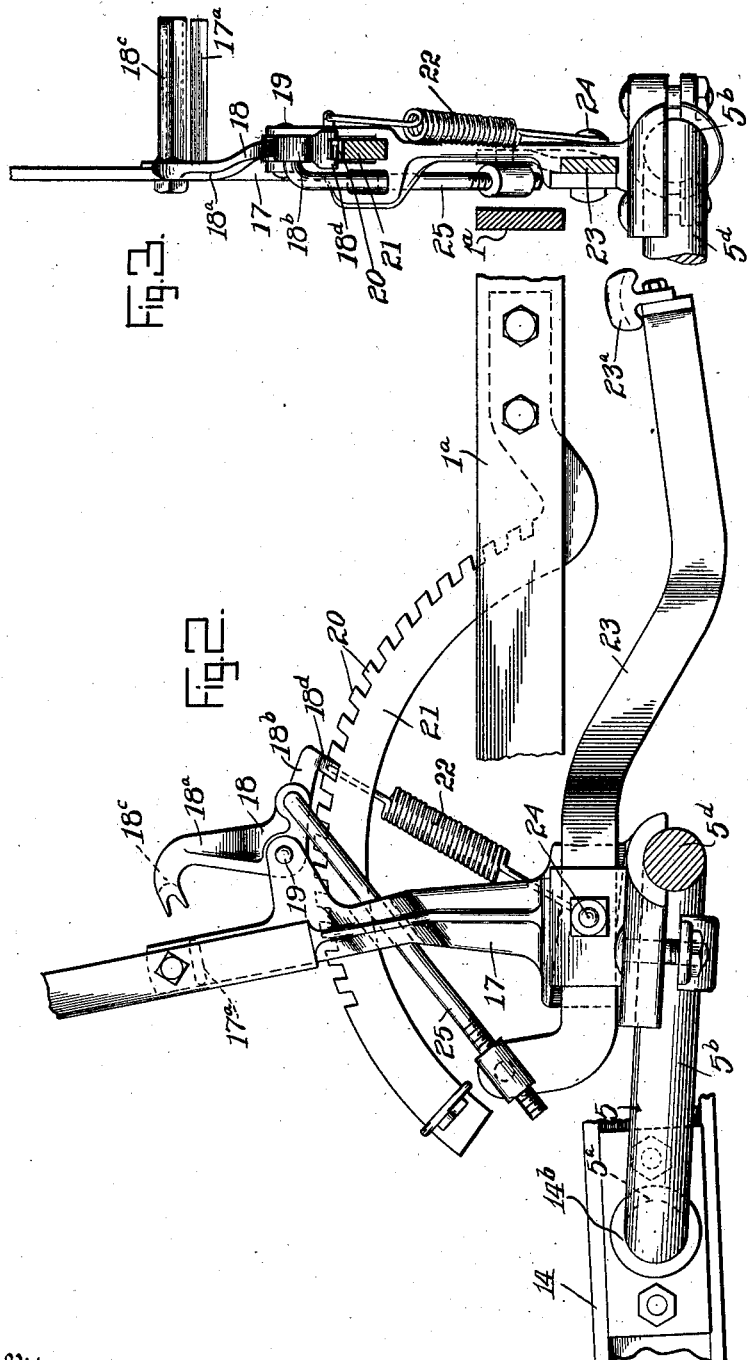

UNITED STATES PATENT OFFICE.

HARRY A. HUNTOON, OF FORT MADISON, IOWA, ASSIGNOR TO FORT MADISON PLOW COMPANY, A CORPORATION OF IOWA.

PLOW-ADJUSTING MECHANISM.

1,078,285.  Specification of Letters Patent.  Patented Nov. 11, 1913.

Application filed May 1, 1913. Serial No. 764,793.

*To all whom it may concern:*

Be it known that I, HARRY A. HUNTOON, a citizen of the United States, and a resident of Fort Madison, county of Lee, and State of Iowa, have invented a new and useful Improvement in Plow-Adjusting Mechanism, of which the following is a specification.

This invention relates to wheeled plows, and the invention consists of an improved form of mechanism for raising and lowering the plow, and for controlling the depth of the furrow, which mechanism is adapted to be actuated by the feet of the driver so that his hands will be left free for the management of the team.

My improved mechanism is shown in the accompanying drawings as applied to a plow which is carried by a swinging bail mounted in a wheeled frame, my improved mechanism comprising two foot-levers connected with the bail for swinging the same to respectively raise and lower the plow, one of the foot-levers being provided with a latch for holding the lever and connected parts in position, and the said latch being connected with the other foot-lever so as to be automatically operated thereby. It will be understood, however, that the mechanism is not limited in its application to a plow of this particular form; and further, it will be understood that the invention is not limited to any particular form or construction of the detailed parts, except in so far as such limitations are defined in the claims.

In the accompanying drawings: Figure 1 is a top plan view of a wheeled plow, having my invention applied thereto. Fig. 2 is a longitudinal sectional elevation, showing the foot-operated controlling mechanism on an enlarged scale, with the parts in the position they occupy when the plow is elevated. Fig. 3 is a transverse sectional elevation of the same.

Referring to the drawings, 1 represents the frame of the machine comprising the fore and aft frame bars $1^a$ and $1^b$ and the rear cross bar $1^c$, which in the present instance is a lateral diagonal continuation of the frame bar $1^b$. At its front end at the furrow side, the frame is sustained by a swiveling furrow wheel 2; at the land side, by a land wheel 3; and at the rear, by a swiveling caster wheel 4, which several parts may be of any appropriate or well-known construction and form, except in so far as they may coöperate with my improved mechanism.

5 represents a swinging bail comprising a central transverse bar $5^a$, crank arms $5^b$, $5^c$, extending rearwardly from the ends of the transverse bar, and journal arms $5^d$ and $5^e$ extending outwardly in opposite directions from the ends of the crank arms. This bail is mounted in the front portion of the frame, so that it may be swung on an axis coincident with the axes of the journal arms, the journal arm $5^d$ on the land side being mounted in a bearing in a hanger 6 fixed to the frame bar $1^a$, and the journal arm $5^e$ on the furrow side being mounted in bearings in hangers 7 and 8 fixed to the frame bar $1^b$ and to a bracket bar $1^d$ at the outer side of the frame bar. The journal arm $5^d$ is extended at the land side of the machine beyond the side of the frame, and has loosely mounted on its extended end, a rearwardly extending arm 9 carrying a spindle $9^a$ on which the land wheel 3 is mounted, the arm 9 being connected by means of a spiral spring 10, to an adjusting lever 11 fulcrumed at its lower end on the journal arm $5^d$ and provided with a locking dog 12 adapted to engage the teeth of a segment frame 13 fixed to the frame bar $1^a$. By means of this lever the land wheel may be adjusted up and down relatively to the frame of the machine for "leveling" the plow in the usual manner.

14 represents a plow beam carrying a plow 15 and extending in a fore and aft direction between the frame bars $1^a$ and $1^b$, the said beam being suspended from the transverse bar $5^a$ of the bail by means of a bearing $14^b$ fixed to the beam and loosely encircling the bar $5^a$, with the result that when the bail is swung in its bearings in the frame, the plow beam will be moved up and down. In rear of its connection with the bail 5, the beam is loosely connected with a guiding bail 16 mounted in bearings $16^a$, $16^a$, on the frame bars, so that when the front bail 5 is swung to raise and lower the plow, the beam will be guided and moved bodily up or down as the case may be.

17 represents an upright foot-lever which is rigidly fixed at its lower end to the crank arm $5^b$ of the bail 5 and is provided at its upper end with an inwardly extending lateral foot rest $17^a$ to enable the foot-lever to be operated by the driver's foot, who, by pushing forward on the rest, will swing the crank arms of the bail down and will lower the plow. An angular locking latch 18, comprising an upright arm $18^a$ and a rearwardly extending horizontal arm $18^b$, is pivoted at the junction of the two arms to the side of the lever 17 by means of a horizontal transverse pivoting bolt 19. The upright arm of the latch is provided with a horizontal transversely extending foot-rest $18^c$ at or about the level of the foot-rest $17^a$ before alluded to, by means of which foot-rest $18^c$ the latch may be released by the foot. The other arm of the latch is provided with a depending tooth $18^d$ adapted to engage between teeth 20 on a segment frame 21 fixed to the frame bar $1^a$; whereby the lever 17 and the parts connected thereto may be fixedly locked in position relatively to the frame of the machine.

As a result of the construction described, and assuming that the parts are in the position of Fig. 1 with the plow raised and held by the locking latch 18, the driver by pushing forward with his foot against the foot-rest on the latch will rock the same on its pivotal connection with the foot-lever, and thereby lift the locking tooth free of the teeth on the fixed segment frame, thus releasing the lever. By the continued forward pressure of the foot, the foot-rest of the latch will be forced into engagement with the foot-rest $17^a$ of the foot-lever 17, and the continued pressure of the foot will rock lever 17 forwardly and thereby will swing bail 5 downwardly and lower the plow. When the proper depth has been reached, the driver releases the pressure of his foot on the latch and the latter will be automatically reëngaged with the teeth on the fixed segment frame, by means of a spring 22 fixed at one end to the latch in rear of its pivotal support, and fixed at its other end to the foot-lever 17.

The elevation of the plow is effected by means of a second foot-lever 23 fulcrumed between its ends, by means of a horizontal transverse pivoting bolt 24, to the outer side of the foot-lever 17 closely adjacent to the journal arm $5^d$ of the bail. This lever projects rearwardly where it is provided with a lateral foot-rest $23^a$ for operating it. Its forward end is extended upwardly and has pivotally connected with it, one end of a link 25, the upper end of which is pivotally connected with the horizontal arm of the latch, the construction being such that the lever 23 is bodily movable with the lever 17, and in addition to this movement it is capable of a relative limited movement on the fulcruming bolt, sufficient in extent to swing the locking latch on its axis and disengage the same from the toothed segment frame. Assuming the plow to be in lowered position, and it is desired to elevate the same and lock it raised, the driver presses down with his foot on the foot-rest $23^a$, with the result that the first motion of the lever 23 will be relative to the lever 17 and will release the locking latch 18, the continued pressure on the lever causing the foot-lever 17 to move with it and thereby swinging the bail upwardly, with the result that the plow will be elevated to the desired position. When this position is reached, the operator releases the pressure on lever 23, and spring 22 will act as before to reëngage the locking latch with the toothed segment frame. It is seen, therefore, that the operator by resting his two feet respectively on the foot-rests of the two levers 17 and 23, maintains perfect control over the plow and is enabled to raise or lower the same promptly and with facility, and to nicely adjust the depth of cut, while his hands are entirely free to manage the draft team. The construction is simple in form, compact in arrangement, and effective in operation, the movement of the bail being positively effected by both levers, and the release of the parts to effect the adjustments and locking of the parts in the changed position, being effected automatically.

Having thus described my invention, what I claim is:

1. In a wheeled plow, the combination of a frame, a plow sustained thereby and movable up and down, a foot-lever for raising the plow, a second foot-lever for lowering the plow, a latch on one of said foot-levers for locking the same in position, and a connection between said latch and the other foot-lever.

2. In a wheeled plow, the combination of a frame, an axle movably mounted therein, a plow connected with said axle, a foot-lever connected with the axle for rocking the same to lower the plow, a second foot-lever connected with the axle for rocking the same to raise the plow, a latch on one of said levers to hold the same in its adjusted position, and a connection between the said latch and other lever.

3. In a wheeled plow, the combination of a frame, a plow mounted therein and movable up and down, a foot-lever for raising the plow, a second foot-lever for lowering the plow, a locking latch on the last-mentioned foot-lever for locking the lever in position, and a connection between said latch and the other lever.

4. In a wheeled plow, the combination of a wheeled frame, a swinging bail mounted therein, a plow connected with the bail, a foot-lever connected with the bail, a latch on the lever to lock the same in position, and a second foot-lever also connected with the bail and movable to a limited extent relatively thereto and connected with the latch.

5. In a wheeled plow, the combination of a frame, a swinging bail mounted therein, a plow connected with the bail, a lever connected with the bail, a foot-operated latch connected with the lever to hold the same in position, and a second lever connected with the bail and connected also with said latch.

6. In a wheeled plow, the combination of a frame, a swinging bail mounted therein, a plow connected with the bail, a foot-lever fixed to the bail for lowering the plow, a latch carried by said lever and adapted to lock the same in position, a second foot-lever connected with the bail so as to have a limited movement relatively thereto, and a connection between said second lever and the latch.

7. In a wheeled plow, the combination of a frame, a swinging bail mounted therein, a plow carried by the bail, a foot-lever fixed to the bail, a foot-operated latch mounted on the lever and adapted to hold the same in position, a second foot-lever fulcrumed between its ends on the bail so as to be movable to a limited extent relatively thereto, and a connection between the forward end of said lever and the latch.

In testimony whereof I hereunto set my hand this second day of April, 1913, in the presence of two attesting witnesses.

HARRY A. HUNTOON.

Witnesses:
J. H. SAMUELS,
C. R. HULL.

---

Copies of this patent may be obtained for five cents each, by addressing the " Commissioner of Patents, Washington, D. C."